Nov. 6, 1934.                Z. C. BRADFORD                1,979,445
                            CENTRIFUGAL SWITCH
                           Filed Dec. 30, 1931           2 Sheets-Sheet 1

Inventor
Zerbo C. Bradford
By Spencer Hardman & Fehr
his Attorneys

Nov. 6, 1934.    Z. C. BRADFORD    1,979,445
CENTRIFUGAL SWITCH
Filed Dec. 30, 1931    2 Sheets-Sheet 2
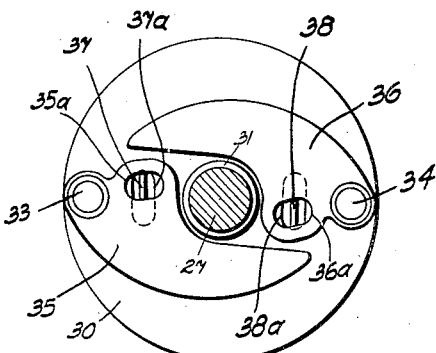
Fig. 5
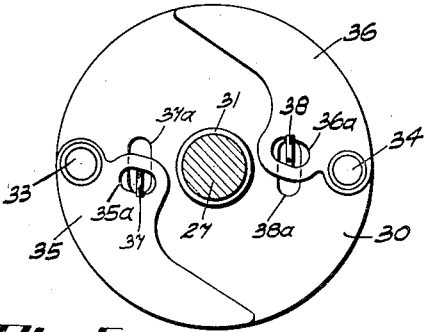
Fig. 6
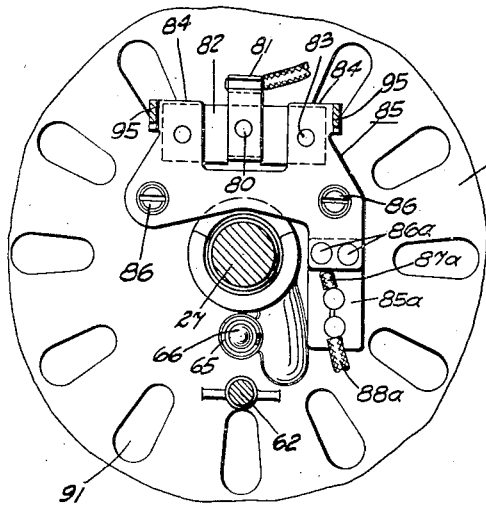
Fig. 3
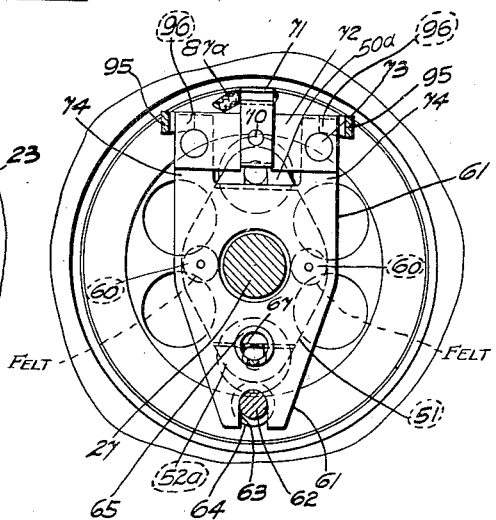
Fig. 4
Fig. 7
Inventor
Zerbe C. Bradford
By Spencer Hardman & Fehr
his attorneys Patented Nov. 6, 1934

1,979,445

UNITED STATES PATENT OFFICE 1,979,445

CENTRIFUGAL SWITCH

Zerbe C. Bradford, Dayton, Ohio, assignor, by mesne assignments, to General Motors Corporation, Detroit, Mich., a corporation of Delaware Application December 30, 1931, Serial No. 583,906

5 Claims. (Cl. 200—80)

This invention relates to centrifugal switches for alternating current motors which are started through the agency of a stator which is disconnected or short circuited when the motor attains a certain speed.

It is one of the objects of the present invention to provide a centrifugal switch of simple and economical construction which can be located within the boundaries of the stator windings of the motor. In order to accomplish this object I preferably locate adjacent one end of the rotor core the fly weights and mechanism for translating motion of the weights into motion longitudinally of the motor shaft. This longitudinal motion is transmitted to a disc located adjacent the opposite end of the rotor core by rods extending through the core. This disc operates upon a switch mounted upon one of the motor end frames and houses within the confines of the stator windings overhanging the adjacent end of the rotor.

More particularly, it is an object of the present invention to combine the fly weight and motion translating structure with a fan for cooling the motor.

Further objects and advantages of the present invention will be apparent from the following description, reference being had to the accompanying drawings, wherein a preferred embodiment of one form of the present invention is clearly shown.

Figure 2:
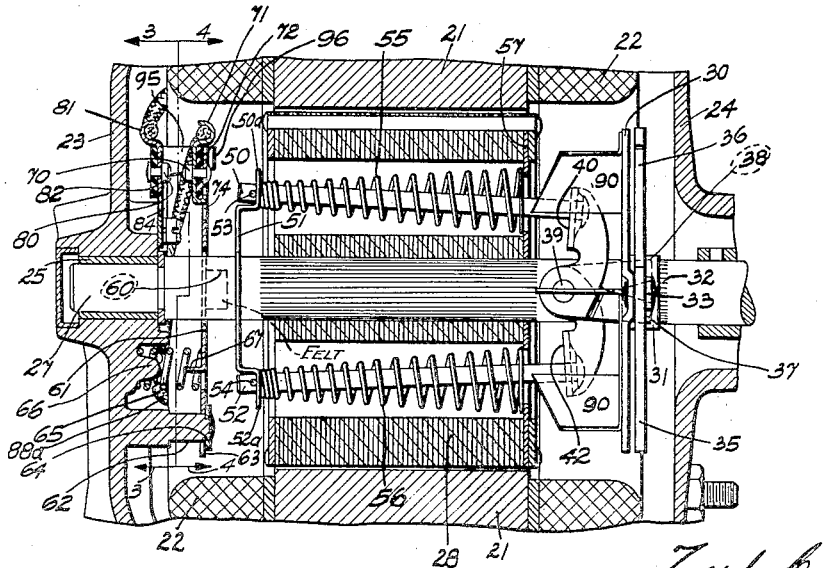
Fig. 2 is a fragmentary sectional view corresponding to Fig. 1 showing the switch open.

Figs. 3 and 4 are sectional views taken respectively on lines 3—3 and 4—4 of Fig. 2.

Figure 1:
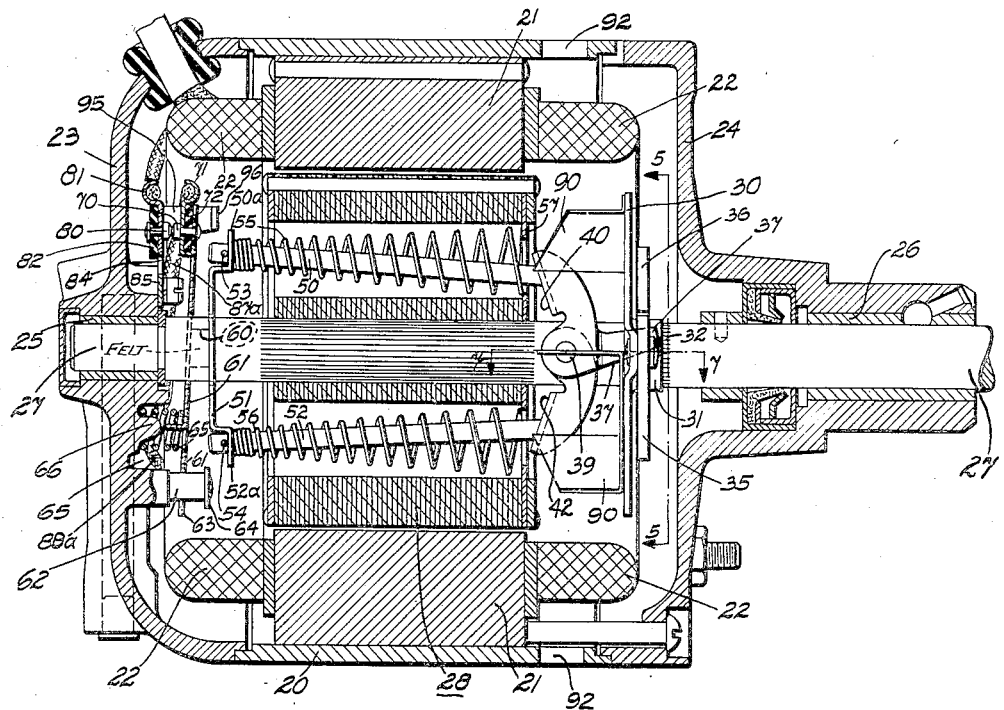
Fig. 1 is a longitudinal sectional view of an electric motor equipped with a centrifugal switch embodying the present invention, the switch being in closed position which it normally occupies when the motor is at rest.

Fig. 5 is a sectional view on line 5—5 of Fig. 1 and shows the weights in a position corresponding to that of Fig. 1.

Fig. 6 is a view similar to Fig. 5 showing the weights in a position corresponding to that of Fig. 2.

Fig. 7 is a sectional view on line 7—7 of Fig. 1.

Referring to Fig. 1, 20 designates a frame carrying stator core 21, stator windings 22 and end frames 23 and 24 carrying bearings 25 and 26, respectively, which support an armature shaft 27 carrying a rotor 28.

The shaft 27 carries substantially within the confines of the right hand projecting portions of the stator windings 22 a structure which is a combination of a motor cooling fan and a centrifugal device for controlling the motor starting circuit switch. This mechanism comprises a disc 30 which as shown in Fig. 7 has a centrally located tubular flange 31 which is press-fitted over the knurled portion 32 of the shaft 27. The disc 30, preferably made of formed sheet metal, carries pivot studs 33 and 34 which pivotally support weights 35 and 36 respectively that are preferably made of formed sheet metal and provided with slots 35a and 36a respectively which receive lever arms 37 and 38 which pass through slots 37a and 38a, respectively, provided by the disc 30. The arm 37 is pivoted upon a pin 39 carried by the shaft 27 and is integral with a yoke 40 connecting said arm 37 with an arm 41 located adjacent to the arm 38 and is also pivoted upon the pin 39, said arm and yoke members also being preferably made of formed sheet metal. The arm 38 is also pivoted upon pin 39 and is integral with a yoke 42 connecting said arm 38 with an arm 43 also pivoted upon the pin 39 and located adjacent the arm 37. It is therefore apparent that when the weights 35 and 36 move outwardly from the position shown in Fig. 5 to that shown in Fig. 6, the levers 37 and 38 will move downwardly and upwardly, respectively, as viewed in Fig. 2 or counterclockwise and clockwise, respectively, as viewed in Fig. 6. Thus the yokes 40 and 42 move somewhat axially toward the right with respect to the shaft 27 and move from the position shown in Fig. 1 to that shown in Fig. 2. This approximately axial movement of the yokes 40 and 42 is transmitted through rods 50 and 52 to a disc 51 through which the shaft 27 extends and which is provided with ears 50a and 52a through which the rods 50 and 52 pass. Relative motion between the disc 51 and left hand ends of rods 50 and 52 is limited by cross pins 53 and 54 which restrain movement of compression springs 55 and 56, respectively, surrounding the rods 50 and 52 and bearing against a plate 57 which is apertured to permit movement of the rods therethrough, the apertures being smaller than the contiguous turn of the springs.

The disc 51 is adapted to engage two felt or fibrous pads 60 attached to a plate 61 through which the shaft 27 extends, and which is somewhat pivotally supported upon a fulcrum provided by the end frame 23. The fulcrum comprises a stud 62 received by a notch 63 provided by the plate 61 and carrying a washer 64 which retains the plate 61 upon stud 62 against the action of a spring 65 retained by lug 66 on the frame 23 and by a punched out projection 67 of the plate 61. Obviously the spring tends to push the plate 61 away from the frame 23 and tends to open the switch contact 70, attached together with a clip 71 to a nonconducting bar 72 which in turn is attached by rivets 73 to the upwardly extending portion 74 of the plate 61. The contact 70 cooperates with a contact 80 which together with a clip 81 is attached to a nonconducting bar 82 attached by rivets 83 to the upwardly extending portions 84 of a plate 85 attached by screws 86 to the end frame 23. A conducting member 85a is attached to the lower portion of the stationary plate 85 by rivets 86a and is adapted electrically to connect the lead wire 87a, attached to the movable contact 70, with a lead 88a of a starter winding as best disclosed in Figs. 3 and 4.

The weight carrying disc 30 carries a plurality of fan blades 90 which surround the levers 37, 38, yokes 40 and 42, and lever arms 41 and 43 and operate to cause circulation of air through the motor frame for cooling the motor. The end frame 23 is provided with ventilation holes 91 and the frame 20 with ventilation holes 92. Obviously, the fan will induce circulation of air from the outside through the holes 91, through the gap between the stator and the rotor and through holes in the rotor which receive the rods 50, 52, and springs 55, 56, the warm air being expelled through holes 92 in frame 24.

When the motor is at rest as shown in Fig. 1, the springs 55 and 56 are expanded to maintain the disc 51 against the pads 60 and the plate 61 in position for maintaining the contact 70 in engagement with the other switch contact 80. The springs 55 and 56, being relatively strong, compress the spring 65 and cause the lower end of the plate 61 to be spaced to the left of the stop washer 64. As the speed of the motor increases, the weights 35 and 36 fly outwardly from the shaft into the position shown in Fig. 6, thereby causing the rods 50 and 52 to move toward the right against the action of the springs 55 and 56. As the plate 51 moves toward the right from the position shown in Fig. 1, the spring 65 follows up such movement by causing the plate 61 to move laterally toward the right while its pads 60 rock upon the plate 51. This movement of plate 61 continues until its forked lower end engages the washer 64 and then its upper end begins to move so as to separate the contact 70 from the contact 80. Movement of the upper end of plate 61 is limited by stop lugs 96 integral with parts 95 projecting from plate 85. Thus the circuit of the stator windings of the motor is broken by the separation of contact 70 from contact 80. When the motor current is shut off and the speed is reduced, the weights 35 and 36 will move toward the shaft 27 under the action of the springs 55 and 56, the levers 37 and 38 will move into the position shown in Fig. 1 and the plate 51 will move toward the left to engage the pads 60 and thereby move the plate 61 into the normal position shown in Fig. 1 thereby causing the contact 70 to reengage the contact 80 whereupon the starting circuit of the motor will be completed so that, when the motor current is turned on again, the motor will start.

It is apparent from the foregoing description of the construction and mode of operation of the switch embodying the present invention that the present switch is substantially confined within the boundaries of the overhanging portion of the stator windings 22 and that the centrifugal device is housed within the confines of a fan for cooling the motor.

The "lost-motion" or "floating fulcrum" pivotal connection between the plate 61 and the end frame 23 permits the plate 61 to be made of rigid instead of springy material, all resiliency being provided by the helical spring 65 whose resiliency remains practically constant with use, whereas a plate of spring material might lose some of its resiliency. It should be noted that this construction permits the weights 35 and 36 to be returned to innermost position regardless of variations within reasonable limits, in dimensions of parts connecting the weights 35 and 36 with the plate 61. Then, also, since the spring is nearer to one end of the plate than to the other, and the centrifugally actuated means acts upon the plate at a point intermediate the spring and contact end of the plate, movement of the centrifugal members and plate is started before the contacts are disengaged. This permits those members to gain velocity, so that when the contacts are disengaged, the break occurs more quickly and rapidly.

While the form of embodiment of the present invention as herein disclosed constitutes a preferred form, it is to be understood that other forms might be adopted, all coming within the scope of the claims which follow.

What is claimed is as follows:

1. In a centrifugal switch, the combination comprising, a formed sheet metal disc, formed sheet metal weight members pivotally mounted on the disc, pivotally mounted yoke members also formed of sheet metal and coupled with and adapted to be actuated by the weight members so as to move in a plane substantially perpendicular to the plane of motion of the weight members, rods attached at one end to said yoke members so as to be moved substantially longitudinally thereby, and coil spring surrounding said rods and having one end fixed and the other end fixedly linked to said shaft to resist motion of said rods in response to movement of the weights in one direction.

2. In a centrifugal switch, the combination comprising, a movable plate having a contact mounted near one end thereof, a stationary contact in alignment for engagement with the first mentioned contact, means for guiding movement of both ends of the plate in a direction substantially transverse to the plane of the plate to effect engagement and disengagement of said contacts, stops for limiting movement of the ends of the plate, a spring urged against one side of the plate for effecting movement of the plate in one direction, and means for applying force near the mid-portion of said plate to effect motion thereof in the other direction.

3. In a centrifugal switch, the combination comprising, a movable plate having a contact mounted near one end thereof, a stationary contact in alignment for engagement with the first mentioned contact, a spring urged against one side of the plate and nearer to the end of the plate opposite the contact than to the end near which the contact is mounted, means for slidably mounting the plate so that it is movable in a direction substantially transverse to the plane of the plate to effect engagement and disengagement of the contacts, stops for limiting the movement of the plate effected by the urging force of said spring, and means for applying force near the mid-portion of the plate to effect movement thereof against the urging force of the spring.

4. A centrifugal switch comprising, in combination, a movable plate having a contact mounted near one end thereof, a stationary contact in alignment for engagement with the first mentioned contact, means for guiding movement of both ends of the plate in a direction substantially transverse to the plane of the plate to effect engagement and disengagement of the contacts, stops for limiting movement of the ends of the plate, a spring urged against one side of the plate for effecting movement of the plate in one direction, and centrifugal means for controlling the movement of the plate.

5. In a centrifugal switch, the combination comprising, a movable plate having a contact mounted near one end thereof, a stationary contact in alignment for engagement with the first mentioned contact, a spring urged against one side of the plate and nearer to the end of the plate opposite the contact than to the end near which the contact is mounted, means for slidably mounting the plate so that it is movable in a direction substantially transverse to the plane of the plate to effect engagement and disengagement of the contacts, stops for limiting the movement of the plate effected by the urging force of said spring, and centrifugally actuated means acting upon the plate intermediate the spring and contact for controlling the movement of the plate.

ZERBE C. BRADFORD.